(12) United States Patent
Kubota et al.

(10) Patent No.: US 7,387,289 B2
(45) Date of Patent: Jun. 17, 2008

(54) METHOD AND APPARATUS FOR DRIVING A SOLENOID PROPORTIONAL CONTROL VALVE UTILIZED FOR FLOW RATE CONTROL

(75) Inventors: Kazuya Kubota, Saitama (JP); Tetsuya Kuwayama, Saitama (JP); Norio Matsuda, Saitama (JP)

(73) Assignee: Bosch Automotive Systems Corporation, Tokyo ( * ) Notice: Subject to any disclaimer, the term of this patent is extended or adjusted under 35 U.S.C. 154(b) by 0 days.

(21) Appl. No.: 10/494,336

(22) PCT Filed: Oct. 29, 2002

(86) PCT No.: PCT/JP02/11202

§ 371 (c)(1),
(2), (4) Date: Mar. 10, 2005

(87) PCT Pub. No.: WO03/038324

PCT Pub. Date: May 8, 2003

(65) Prior Publication Data

US 2005/0151103 A1    Jul. 14, 2005

(30) Foreign Application Priority Data

Oct. 30, 2001  (JP) .............................. 2001-333237

(51) Int. Cl.
 F16K 31/02   (2006.01)
 F02M 59/36   (2006.01)
(52) U.S. Cl. ................... 251/129.05; 123/458

(58) Field of Classification Search ........... 251/129.05; 123/458

See application file for complete search history.

(56) References Cited

U.S. PATENT DOCUMENTS

| 4,345,737 A | * | 8/1982 | Kawai et al. ........... 251/129.05 |
| 4,520,420 A | | 5/1985 | Ariyoshi et al. |
| 4,766,921 A | | 8/1988 | Williams |
| 4,949,215 A | | 8/1990 | Studtmann et al. |

(Continued)

FOREIGN PATENT DOCUMENTS

EP        0 438 872        7/1991

(Continued)

OTHER PUBLICATIONS

Supplementary European Search Report dated Oct. 28, 2004, Appl. No. EP 02 80 2243, 4 pages.

(Continued)

*Primary Examiner*—Ramesh Kirshnamurthy
*Assistant Examiner*—Andrew J Rost
(74) *Attorney, Agent, or Firm*—Connolly Bove Lodge & Hutz LLP; Myron K. Wyche

(57) ABSTRACT

In a method for driving a solenoid proportional control valve (44) used for flow rate control of a common rail system pump adapted to regulate flow rate by regulating the duty ratio of a pulse voltage applied to a solenoid coil (F) of a solenoid (44E), when an operating condition liable to cause hysteresis in the operation of the solenoid proportional control valve (44) is present, the peak value or pulse width of the pulse voltage is temporarily increased to instantaneously boost the driving force of the solenoid (44E), thereby ensuring smooth operation of a piston (44C) and stabilizing the flow rate control.

1 Claim, 14 Drawing Sheets

U.S. PATENT DOCUMENTS

| | | | |
|---|---|---|---|
| 6,031,707 A | 2/2000 | Meyer | |
| 6,053,150 A * | 4/2000 | Takahashi et al. | 123/458 |
| 6,073,644 A * | 6/2000 | Friedmann et al. | 251/129.05 |
| 6,262,874 B1 | 7/2001 | Stoll et al. | |
| 6,297,941 B1 | 10/2001 | Hoffmann et al. | |
| 6,367,452 B1 * | 4/2002 | Shima et al. | 123/458 |

FOREIGN PATENT DOCUMENTS

| | | |
|---|---|---|
| EP | 0 563 760 | 10/1993 |
| EP | 0 764 473 | 3/1997 |
| EP | 1 103 709 | 9/2002 |
| JP | 55-82302 | 6/1980 |
| JP | 64-73166 | 3/1989 |
| JP | 5-272390 | 10/1993 |
| JP | 9-277063 | 10/1997 |
| JP | 11-270428 | 10/1999 |
| JP | 2001003791 A * | 1/2001 |
| JP | 2001-182638 | 7/2001 |

OTHER PUBLICATIONS

International Search Report dated Jan. 16, 2003, Int'l Appl. No. PCT/JP02/11202, 2 pgs., JPO, 2003.

* cited by examiner

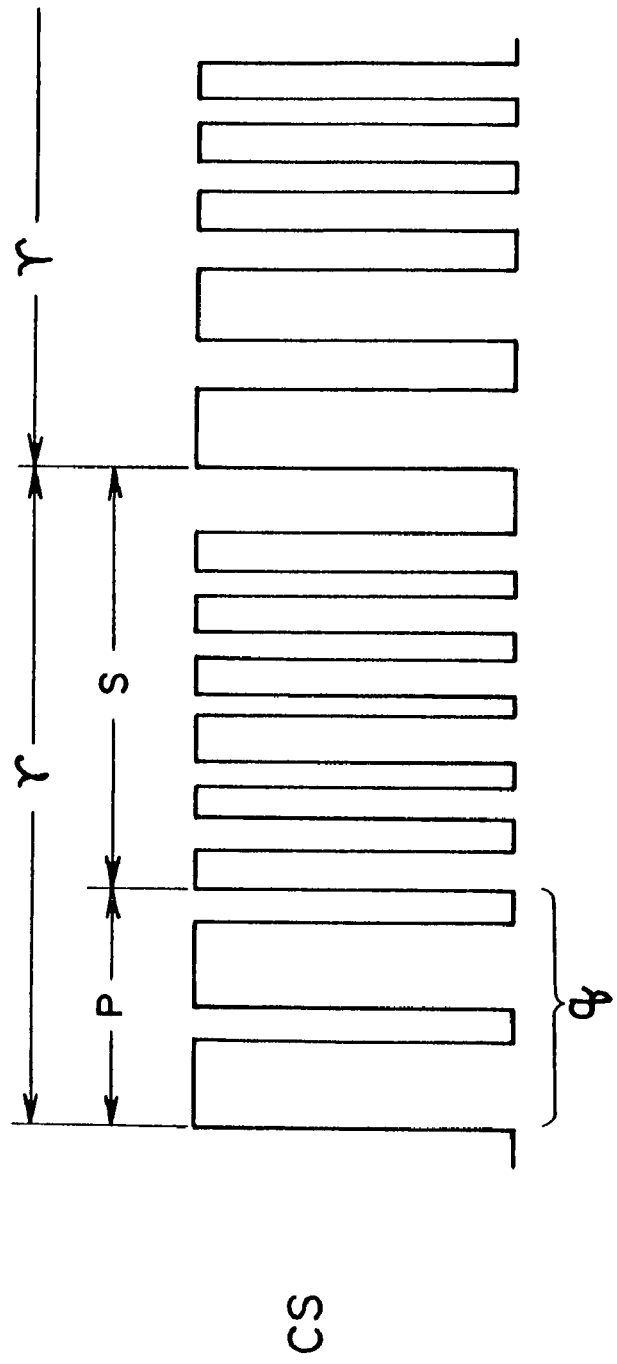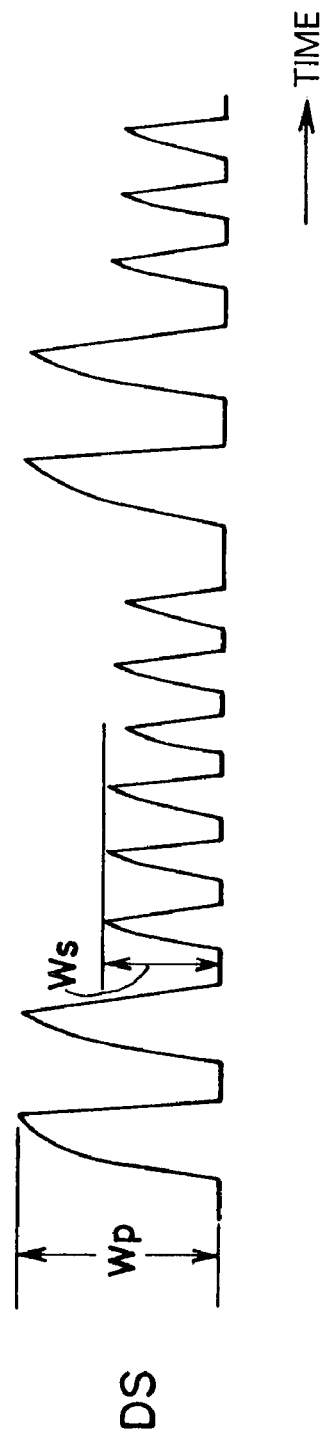

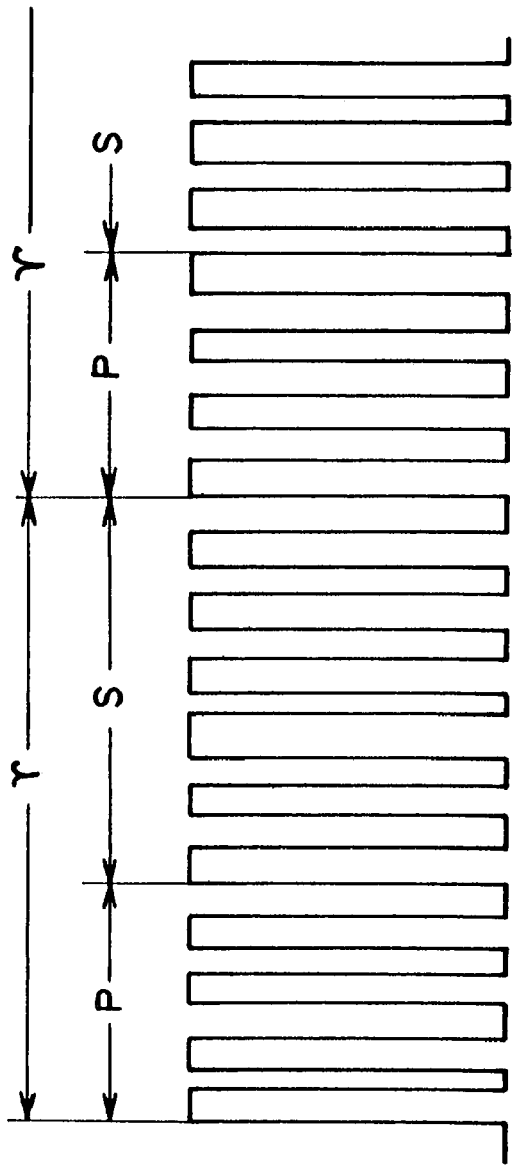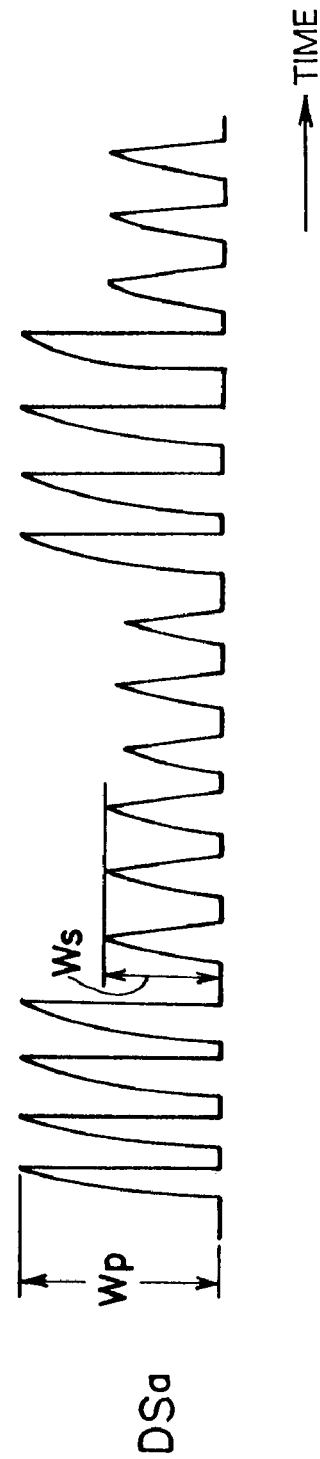

METHOD AND APPARATUS FOR DRIVING A SOLENOID PROPORTIONAL CONTROL VALVE UTILIZED FOR FLOW RATE CONTROL

TECHNICAL FIELD

The present invention relates to a method and an apparatus for driving a solenoid proportional control valve utilized for flow rate control.

BACKGROUND ART

Solenoid proportional control valves for flow rate control have long been used to control the flow rate of liquid fuels and other fluids in various systems. Consider, for example, the fuel injection system that accumulates high-pressure fuel in a common rail and injects the high-pressure fuel through injectors into the cylinders of an internal combustion engine. The pump unit provided for feeding the high-pressure fuel into the common rail in this system includes a feed pump for feeding fuel from a fuel tank and is configured to pressurize the fuel supplied by the feed pump using a high-pressure plunger and to feed the highly pressurized fuel into the common rail. The fuel supplied from the feed pump to the high-pressure plunger is controlled to an amount appropriate for the instantaneous operating condition of the engine by a solenoid proportional control valve.

The solenoid proportional control valve used for this purpose is equipped with a spring-biased piston slidably accommodated in a cylinder and a solenoid for positioning the piston against the biasing force of the spring. The positional relationship between the piston and cylinder is controlled in proportion to the magnitude of the driving current supplied to the solenoid to regulate the open area of a fuel passage port formed in the cylinder and thus regulate the flow rate of fuel passing through the solenoid proportional control valve.

Ordinarily, the coil of the solenoid of the so-configured solenoid proportional control valve is supplied with a constant frequency pulse voltage and the fuel flow rate is regulated by varying the duty ratio of the pulse voltage so as to regulate the effective value of the driving current supplied to the solenoid.

In the so-configured solenoid proportional control valve, however, static and dynamic friction arises between the piston and cylinder during operation, and the hysteresis produced in the movement of the piston by this mechanical operating friction causes a decline in the responsivity of the valve system, deviation in the controlled flow rate and other effects that create a problem by making it impossible to conduct the flow rate control stably.

An object of the present invention is to provide a method and apparatus for driving a solenoid proportional control valve utilized for flow rate control that can overcome the aforesaid problem of the prior art.

Another object of the present invention is to provide a method and apparatus for driving a solenoid proportional control valve utilized for flow rate control that can realize stable flow rate control.

Another object of the present invention is to provide a method and apparatus for driving a solenoid proportional control valve utilized for flow rate control that can realize stable flow rate control without increasing cost or electric power consumption.

DISCLOSURE OF THE INVENTION

The present invention is characterized in the point that in a method for driving a solenoid proportional control valve utilized for flow rate control, which regulates flow rate by regulating a duty ratio of a pulse voltage applied to a coil of a drive solenoid to control drive current flowing through the coil, electrical energy imparted to the coil is temporarily increased at appropriate time points to instantaneously boost the driving force of the drive solenoid.

The driving force of the drive solenoid can be instantaneously boosted either by temporarily increasing the peak value of the pulse voltage at an appropriate time point or by conducting temporary increase of the peak value of the pulse voltage repeatedly.

Whether or not an operating condition liable to cause hysteresis in the operation of the solenoid proportional control valve utilized for flow rate control is present can be discriminated and the temporary increase of the peak value of the pulse voltage be repeatedly conducted when it is discriminated that an operating condition liable to cause hysteresis in the operation of the solenoid proportional control valve is present.

The present invention is also characterized in the point that in a method for driving a solenoid proportional control valve utilized for flow rate control, which regulates flow rate by regulating a duty ratio of a pulse voltage applied to a coil of a drive solenoid to control drive current flowing through the coil, a pulse width of the pulse voltage is temporarily increased at appropriate time points to instantaneously boost the driving force of the drive solenoid.

The present invention is also characterized in the point that an apparatus for driving a solenoid proportional control valve, which is used to drive a solenoid proportional control valve utilized for flow rate control, comprises:

means for supplying a prescribed frequency drive pulse voltage of a duty ratio corresponding to a control signal supplied from the outside to a coil of a drive solenoid of the solenoid proportional control valve, and means for temporarily increasing a pulse width of the drive pulse voltage at appropriate time points.

The present invention is also characterized in the point that an apparatus for driving a solenoid proportional control valve, which is used to drive a solenoid proportional control valve utilized for flow rate control, comprises:

means for supplying a prescribed frequency drive pulse voltage of a duty ratio corresponding to a control signal supplied from the outside to a coil of a drive solenoid of the solenoid proportional control valve, and means for temporarily increasing a pulse peak value of the drive pulse voltage at appropriate time points.

The present invention is also characterized in the point that in a method for driving a solenoid proportional control valve utilized for flow rate control in a pump of a common rail system adapted to regulate flow rate by regulating a duty ratio of a pulse voltage applied to a coil of a drive solenoid to control drive current flowing through the coil, electrical energy imparted to the coil is temporarily increased at appropriate time points to instantaneously boost the driving force of the drive solenoid.

The present invention is also characterized in the point that in a method for driving a solenoid proportional control valve utilized for flow rate control in a pump of a common rail system adapted to regulate flow rate by regulating a duty ratio of a pulse voltage applied to a coil of a drive solenoid to control drive current flowing through the coil, a peak value of the pulse voltage is temporarily increased at appropriate time points to instantaneously boost the driving force of the drive solenoid.

The present invention is also characterized in the point that in a method for driving a solenoid proportional control valve utilized for flow rate control in a pump of a common rail system adapted to regulate flow rate by regulating a duty ratio of a pulse voltage applied to a coil of a drive solenoid to control drive current flowing through the coil, a pulse width of the pulse voltage is temporarily increased at appropriate time points to instantaneously boost the driving force of the drive solenoid.

The present invention is also characterized in the point that an apparatus for driving a solenoid proportional control valve used to drive a solenoid proportional control valve utilized for flow rate control in a pump of a common rail system comprises:

means for supplying a prescribed frequency drive pulse voltage of a duty ratio corresponding to a control signal supplied from the outside to a coil of a drive solenoid of a solenoid proportional control valve, and means for temporarily increasing a pulse width of the drive pulse voltage at appropriate time points.

The present invention is also characterized in the point that an apparatus for driving a solenoid proportional control valve used to drive a solenoid proportional control valve utilized for flow rate control in a pump of a common rail system comprises:

means for supplying a prescribed frequency drive pulse voltage of a duty ratio corresponding to a control signal supplied from the outside to a coil of a drive solenoid of a solenoid proportional control valve, and means for temporarily increasing a pulse peak value of the drive pulse voltage at appropriate time points.

BRIEF DESCRIPTION OF THE DRAWINGS

FIG. 6A is the waveform of a control output signal of the drive control unit shown in FIG. 4.

FIG. 6B is a current waveform diagram of a solenoid coil drive signal of the drive control unit shown in FIG. 4.

FIG. 11A is a waveform diagram of a control output signal of the drive control unit shown in FIG. 9.

FIG. 11B is a current waveform diagram of a solenoid coil drive signal of the drive control unit shown in FIG. 9.

BEST MODE OF CARRYING OUT THE INVENTION

In order to set out the present invention in greater detail, it will now be explained with reference to the attached drawings.

Figure 1:
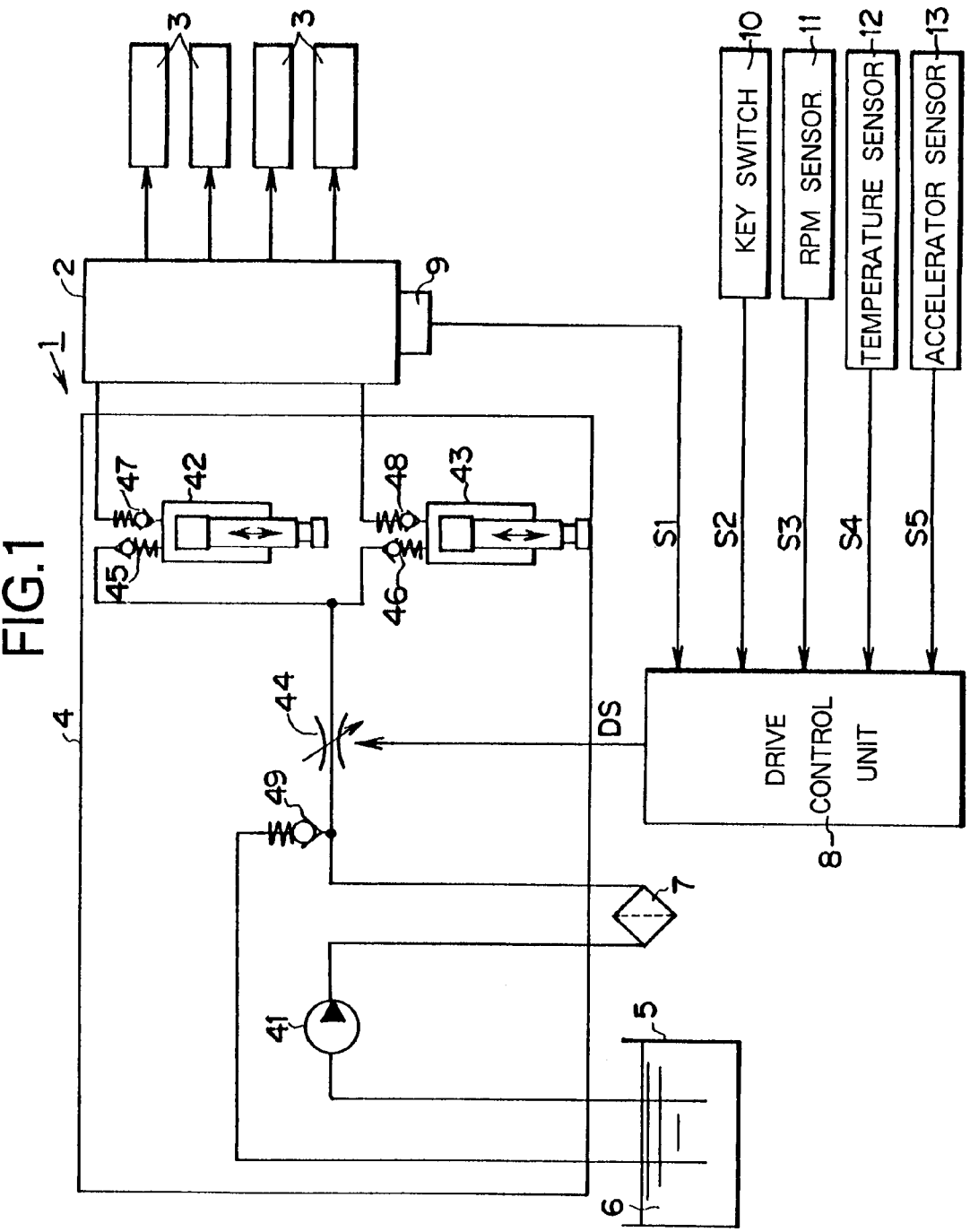
FIG. 1 is a block diagram showing an embodiment of the present invention.

FIG. 1 is a block diagram showing an embodiment of the present invention. Illustrated here is the structure of an internal combustion engine fuel injection system configured using a solenoid proportional control valve drive apparatus according to the present invention. The fuel injection system 1 is a common rail type fuel injection system that uses multiple injectors 3 to inject high-pressure fuel accumulated in a common rail 2 directly into corresponding cylinders of an internal combustion engine not shown in the drawing. The system is configured to supply the high-pressure fuel to the common rail 2 from a pump unit 4.

The pump unit 4 is configured to use a feed pump 41 to pump fuel 6 from a fuel tank 5 through an externally installed filter 7 to a pair of high-pressure plungers 42, 43 driven by a drive section not shown in the drawing. The configuration enables the flow rate of the fuel fed to the high-pressure plungers 42, 43 to be regulated by a solenoid proportional control valve 44 provided between the filter 7 and the high-pressure plungers 42, 43.

The fuel regulated in flow rate by the solenoid proportional control valve 44 is fed through check valves 45, 46 to the associated high-pressure plungers 42, 43 where it is pressurized. The so-obtained high-pressure fuel is fed to the common rail 2 through associated check valves 47, 48. Reference numeral 49 designates a return valve for returning excess fuel on the delivery side of the feed pump 41 to the fuel tank 5. The structure of the pump unit 4 is known and therefore will not be described in detail.

Figure 2:
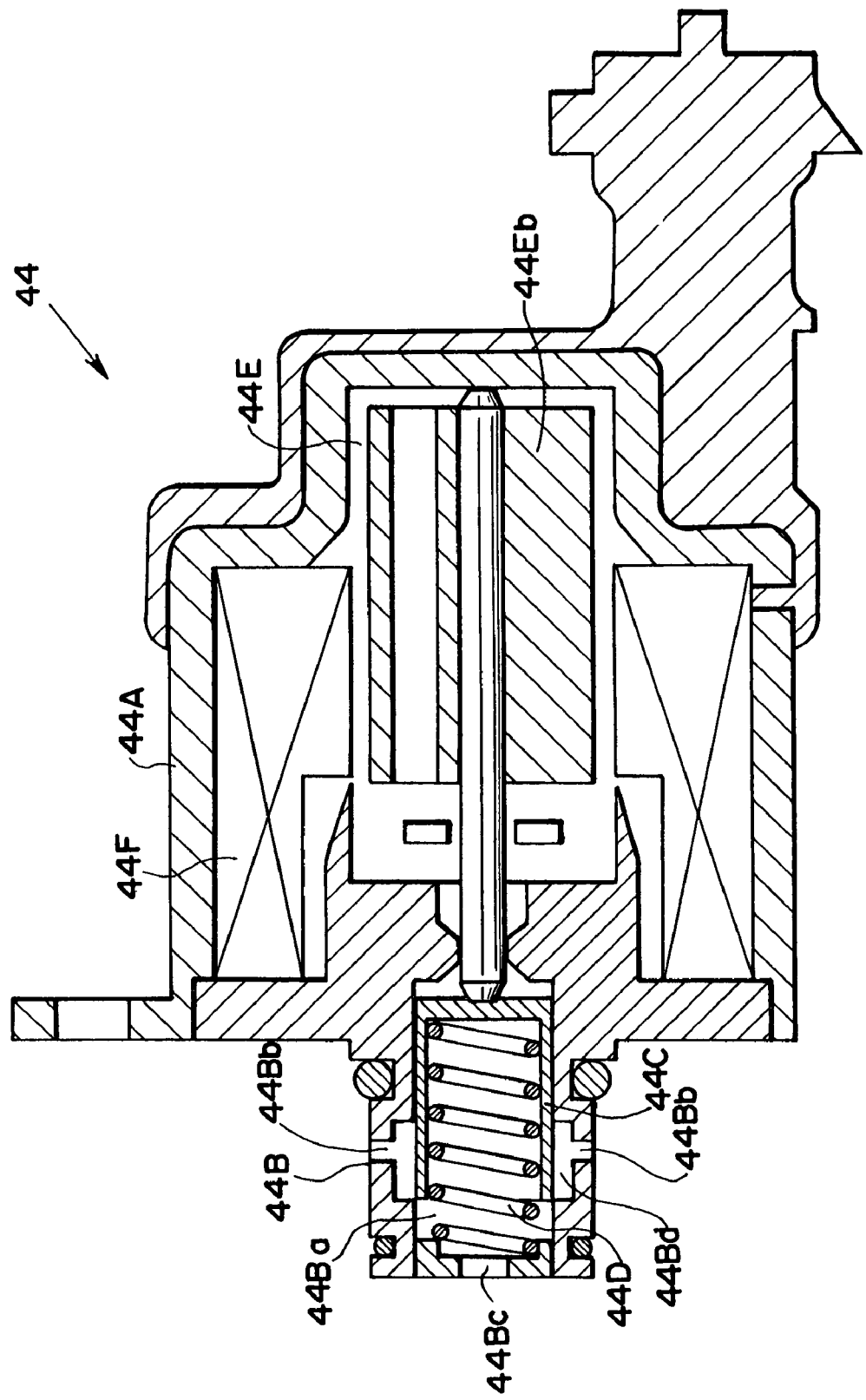
FIG. 2 is a sectional view showing the detailed structure of a solenoid proportional control valve shown in FIG. 1.
Figure 3:
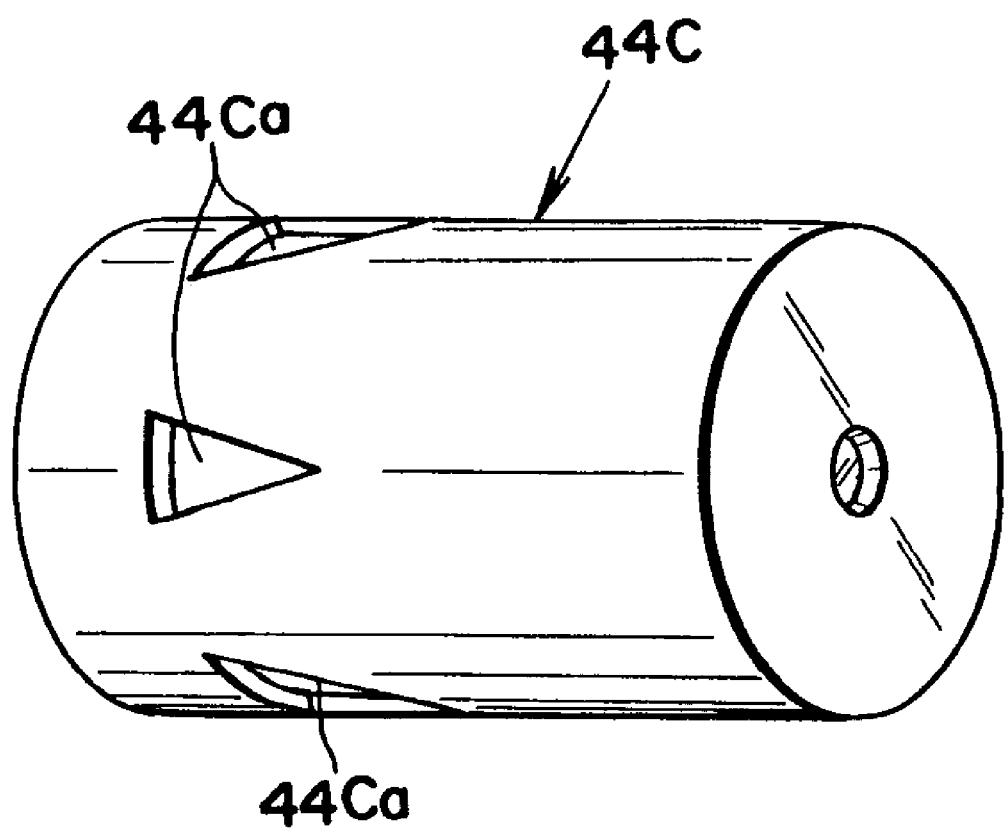
FIG. 3 is an enlarged perspective view of a piston of the solenoid proportional control valve shown in FIG. 2.

FIG. 2 is a sectional view showing the detailed structure of the solenoid proportional control valve 44 shown in FIG. 1. The solenoid proportional control valve 44 has a cylindrical piston 44C open at one end accommodated in a cylinder chamber 44Ba of a cylinder section 44B provided at one end of a casing 44A. The piston 44C is biased by spring 44D toward a solenoid 44E provided in the casing 44A. As shown in detail in FIG. 3, the peripheral wall of the piston 44C is formed in its circumferential direction with multiple, appropriately spaced slits 44Ca.

An anchor 44Eb of the solenoid 44E operates in response to electrical current flowing through a solenoid coil 44F to move the piston 44C against the force of the spring 44D. The piston 44C is therefore positioned at a location where the force of the spring 44D and the driving force of the solenoid 44E determined by the magnitude of the current flowing through the solenoid coil 44F are in equilibrium.

The cylinder section 44B is formed in the illustrated manner with fuel inlet ports 44Bb, 44Bb and a fuel outlet port 44Bc. The inlet ports 44Bb, 44Bb communicate with an annular groove 44Bd formed inside the cylinder section 44B. The slits 44Ca and the annular groove 44Bd form an open region when the piston 44C moves within the cylinder section 44B to bring the slits 44Ca opposite the annular groove 44Bd. The area of the open region varies with the position of the piston 44C to substantially regulate the open areas of the inlet ports 44Bb, 44Bb, thereby enabling regulation of the flow rate of the fuel flowing from the inlet ports 44Bb, 44Bb to the outlet port 44Bc.

Returning to FIG. 1, the fuel injection system 1 is equipped with a drive control unit 8, configured using a microcomputer, for drive-controlling the solenoid proportional control valve 44 shown in FIG. 2. The drive control unit 8 is input with a rail pressure signal S1 representing rail pressure from a rail pressure sensor 9 for detecting the rail pressure, i.e., the fuel pressure in the common rail 2, a key switch ON signal S2 indicating that a key switch 10 is in the ON position, an rpm signal S3 representing rotational speed from a rpm sensor 11 for detecting internal combustion engine speed, a temperature signal S4 representing fuel temperature from a temperature sensor 12 for detecting the fuel temperature in the pump unit 4, and an accelerator signal S5 representing accelerator depression from an accelerator sensor 13 for detecting the amount of manipulation of an accelerator pedal not shown in the drawing.

The drive control unit 8 uses the input signals S1-S5 to calculate the control amount of the solenoid proportional control valve 44 required for obtaining a fuel flow rate suitable for the instantaneous operating condition.

Figure 4:
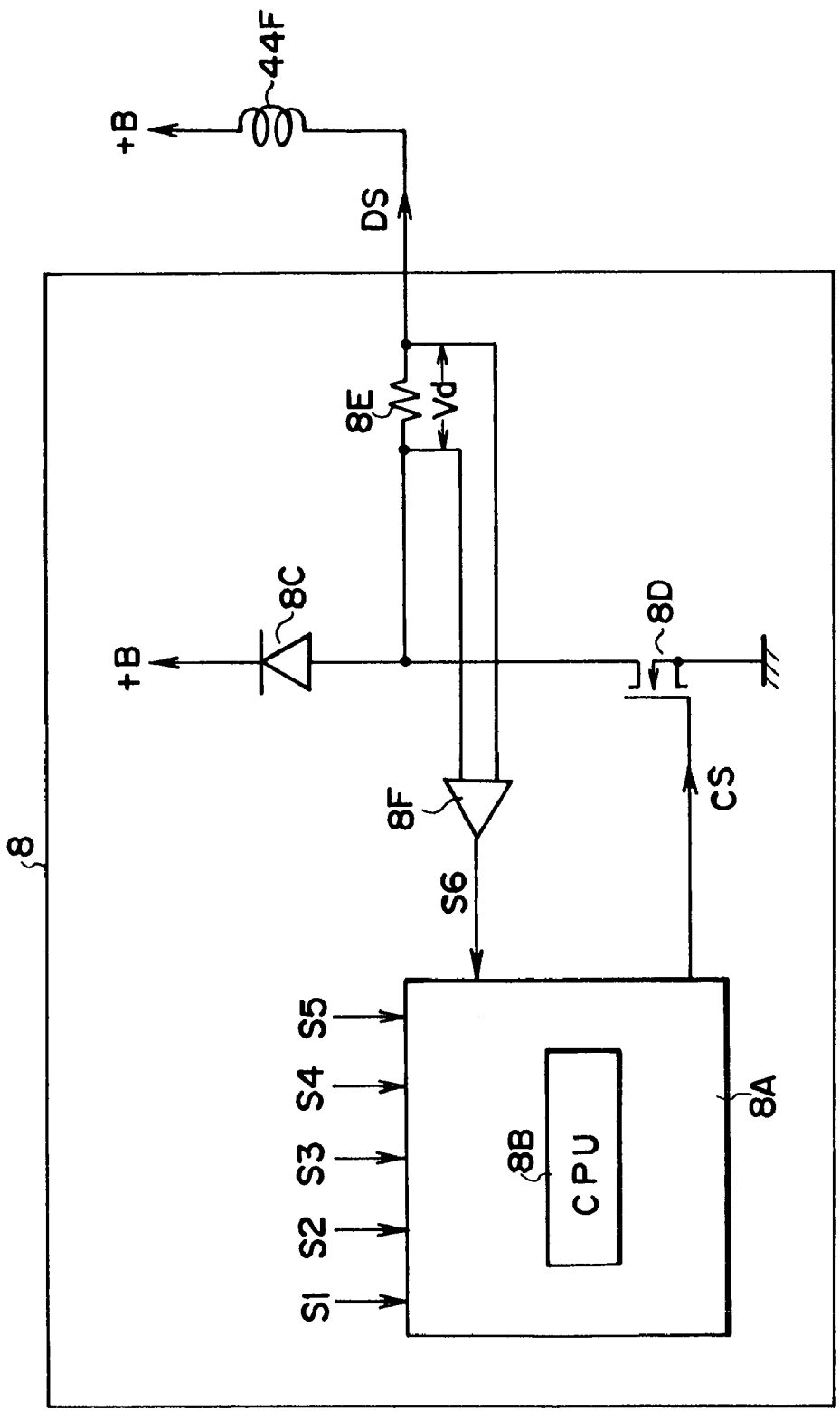
FIG. 4 is a detailed circuit diagram of a drive control unit shown in FIG. 1.

FIG. 4 is a detailed diagram of the drive control unit 8 shown in FIG. 1. A central processing unit (CPU) 8B of a microcomputer 8A processes the input signals S1-S5 in accordance with a control program explained later and outputs a control output signal CS. The drive control unit 8 is equipped with a drive circuit composed of a flywheel diode 8C and a switching transistor 8D. The connection point between the flywheel diode 8C and switching transistor 8D is connected through a detection resistor 8E to one end of the solenoid coil 44F of the solenoid proportional control valve 44 whose other end is connected to a dc power supply +B.

The control output signal CS is a pulse voltage signal of prescribed frequency for conducting duty ratio control of the ON/OFF operation of the switching transistor 8D by a pulse signal. The switching transistor 8D turns ON and OFF in response to the control output signal CS so as to apply a pulse voltage corresponding to the control output signal CS to the solenoid coil 44F. As a result, driving current corresponding to the duty ratio of the pulse voltage signal flows through the solenoid coil 44F as a drive signal DS. A voltage amplifier 8F is responsive to a voltage signal Vd produced by current flowing through a detection resistor 8E to produce and input to the microcomputer 8A a detection signal S6 representing the instantaneous magnitude of the driving current flowing through the solenoid coil 44F.

Figure 5:
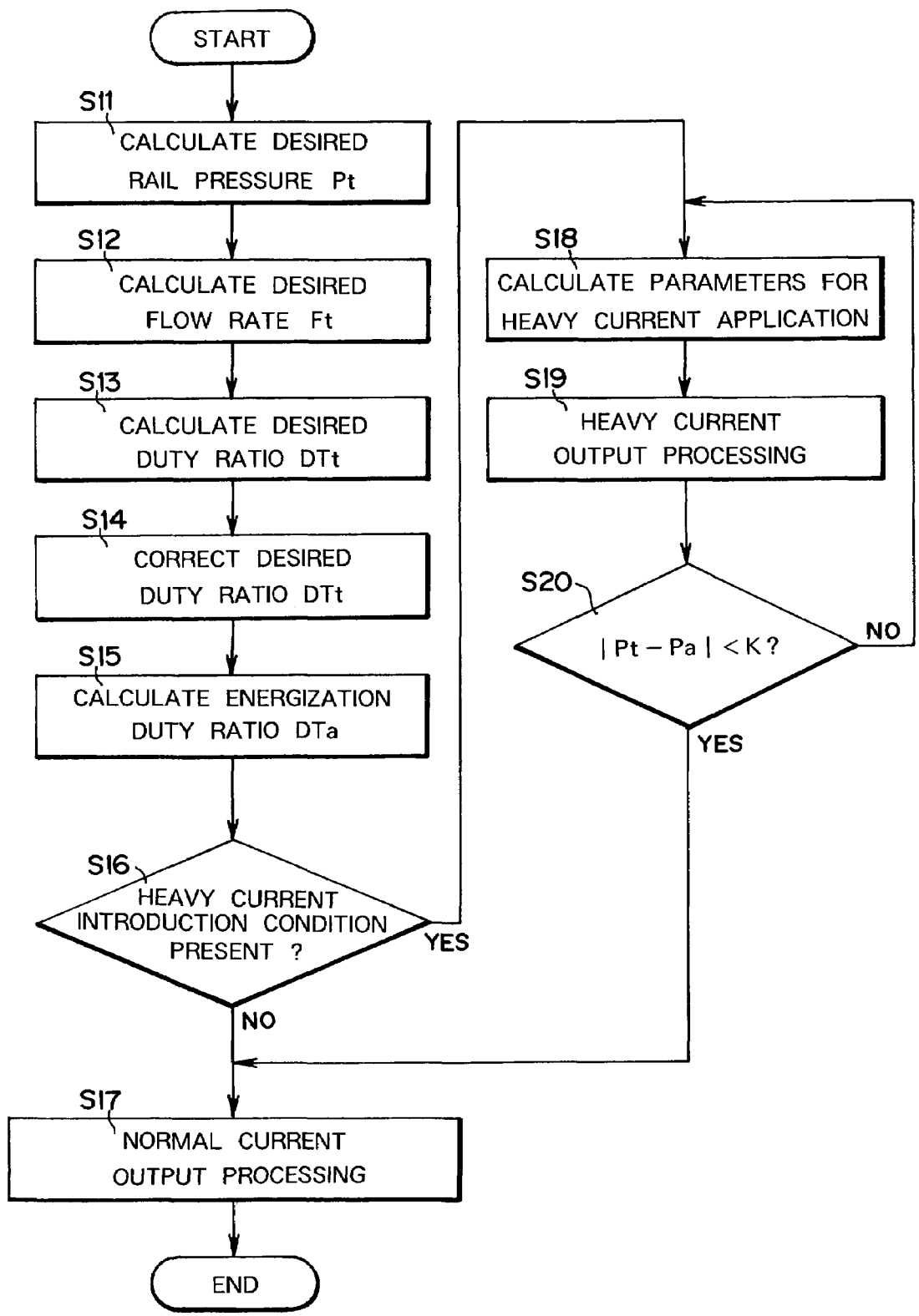
FIG. 5 is a flow chart showing a control program executed in a CPU of the drive control unit shown in FIG. 4.

The control of the driving of the solenoid proportional control valve 44 effected based on the input signals S1-S6 will now be explained with reference to FIG. 5. FIG. 5 is a flow chart showing a control program installed in the microcomputer 8A for drive-controlling the solenoid proportional control valve 44 and executed by the CPU 8B. When this control program is launched to commence its execution, first, in step S11, a desired rail pressure Pt is calculated. The desired rail pressure Pt is calculated based on the accelerator signal S5 and rpm signal S3.

Next, in step S12, a desired flow rate Ft of fuel in the solenoid proportional control valve 44 is calculated from the desired rail pressure Pt and rail pressure signal S1. Then, in step S13, a desired duty ratio DTt of the control output signal CS required for obtaining the desired flow rate is calculated from the desired flow rate Ft and detection signal S6.

In step S14, the desired duty ratio DTt obtained in step S13 is corrected in accordance with the temperature signal S4, and in step S15, an energization duty ratio DTa is calculated based on the correction result in step S14.

Basically, a pulse voltage of prescribed frequency controlled in duty ratio in accordance with the energization duty ratio DTa is output as the control output signal CS. However, when hysteresis is liable to arise in the movement of the piston 44C owing to operating friction at the operating portion of the solenoid proportional control valve 44, a discrimination is made in step S16 regarding the need to introduce heavy current into the solenoid coil 44F so as to temporarily increase the electrical energy imparted to the solenoid coil 44F at appropriate time points and enable the driving force of the solenoid proportional control valve 44 by the control output signal CS to be instantaneously boosted.

The discrimination in step S16 is for determining whether or not a heavy current introduction condition is present. In this embodiment, the discrimination is made regarding each of the five conditions of whether or not: (1) engine starting in progress, (2) engine very cold, (3) engine temperature high, (4) engine in specified speed range, and (5) rail pressure deviation outside prescribed value for prescribed period or longer. Presence of a heavy current introduction condition is discriminated when at least one of these conditions is present. Condition (1) is discriminated based on the key switch ON signal S2. Conditions (2) and (3) are discriminated based on the temperature signal S4. Condition (4) is discriminated based on the rpm signal S3. Condition (5) is discriminated from the result obtained in step S11 and the rail pressure signal S1.

Under an operating condition posing little likelihood of hysteresis arising in the movement of the solenoid proportional control valve 44, the control result in step S16 is NO and the program goes to step S17, in which normal current output processing is executed to output the pulse voltage of prescribed frequency duty ratio controlled in accordance with the energization duty ratio DTa obtained in step S15 as the control output signal CS. The switching transistor 8D turns ON and OFF in response to the control output signal CS and the resulting pulse voltage is applied to the solenoid coil 44F, whereby driving current corresponding to the energization duty ratio DTa flows pulse-like through the solenoid coil 44F of the solenoid proportional control valve 44 as the drive signal DS to control the flow rate of fuel in the solenoid proportional control valve 44 to the desired flow rate Ft.

When presence of a heavy current introduction condition is discriminated, on the other hand, the result in step S16 is YES and the program goes to step S18. In step S18, the parameters required for heavy current application are calculated based on the rail pressure signal S1. The calculation can be done also taking the engine coolant temperature into account. Since application of the heavy current is repeated cyclically for a prescribed time in each cycle, a heavy current application period p per cycle, a number of heavy current applications q per cycle, and a repetition cycle r are calculated.

In step S19, heavy current output processing is executed in accordance with the results of the calculations in steps S15 and S18 so as to duty control opening and closing of the solenoid proportional control valve 44 basically using the pulse voltage of prescribed constant frequency duty ratio controlled in accordance with the energization duty ratio DTa but while repeating q number of applications of heavy current during the current application period p of each cycle r and outputting the control output signal CS in accordance with this processing.

FIG. 6A shows an example of the voltage waveform of the control output signal CS obtained by the processing in step S19. Output of two broad pulse voltages is repeated in the current application period p of each cycle r, while during the remaining period s other than the current application period p, narrow pulse voltages of a prescribed frequency in accordance with the normal current output processing in step S17 are output at the energization duty ratio DTa obtained in step S15. As is clear from the foregoing explanation, the pulse width of the broad pulse voltages for heavy current driving is determined by the current application period p and the number of applications q.

FIG. 6B shows the current waveform of the drive signal DS when the control output signal CS shown in FIG. 6A is applied to the switching transistor 8D as a gate voltage signal. During the current application periods p, the application of the broad pulse voltages makes the time the switching transistor 8D stays ON long to increase the level of the current flowing through the solenoid coil 44F. The peak value Wp of the current flowing through the solenoid coil 44F during the current application periods p is therefore greater than the current peak value Ws when the narrow pulse voltages are applied during the periods s, so that during the current application periods p a larger amount of electrical energy is applied to the solenoid coil 44F than during the periods s, thereby driving the solenoid proportional control valve 44 with larger driving force. In other words, the pulse width of the pulse voltages is temporarily increased at appropriate time points to repeatedly carry out instantaneous boosting of the driving force of the drive solenoid.

Therefore, when operating friction arises in the solenoid proportional control valve 44, the driving force is instantaneously boosted during the current application periods p to enable the piston 44C of the solenoid proportional control valve 44 to overcome the operating friction and operate smoothly. Occurrence of degraded responsivity and controlled variable deviation in the solenoid proportional control valve 44 as a valve device can therefore be effectively minimized to enable stable flow rate control.

In step S20, discrimination is made as to whether the absolute value of the difference ΔP obtained by subtracting the actual rail pressure Pa from the desired rail pressure Pt is smaller than a prescribed value K. When the absolute value of the difference ΔP is smaller than the prescribed value K, this means that the solenoid proportional control valve 44 is operating smoothly. In such case, the discrimination result in step S20 is YES and the program goes to step S17 to conduct normal current output processing.

On the other hand, when the absolute value of the difference ΔP is equal to or greater than the prescribed value K, this means the solenoid proportional control valve 44 is not operating smoothly and heavy current output processing is still necessary. In such case, the discrimination result in step S20 is NO and the program returns to step S18. The execution of steps S18 and S19 is thus cyclically repeated until the absolute value of the difference ΔP becomes smaller than K. Alternatively, a program can be adopted that returns to step S19 when the discrimination result in step S20 is NO.

In the control shown in FIG. 5, the heavy current output processing is repeated in accordance with the parameters decided in step S18 until the difference ΔP becomes smaller than a prescribed value. Instead, however, it is possible to adopt a configuration wherein the parameters decided in step S18 are changed to impart greater electrical energy when the difference ΔP does not become smaller than the prescribed value K after the elapse of a prescribed time following the start of the heavy current output processing.

Figure 7:
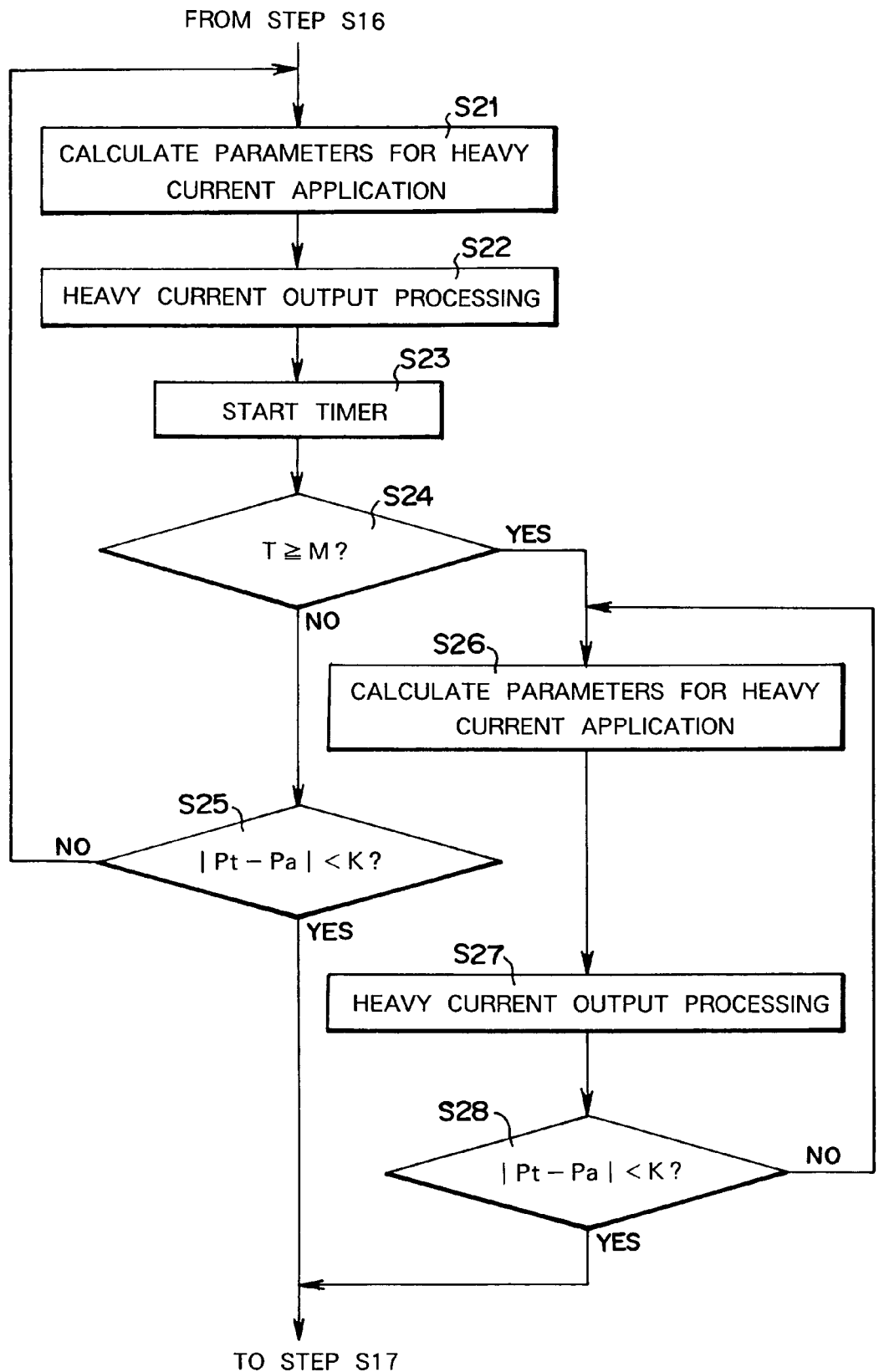
FIG. 7 is the essential part of a flow chart for explaining a modification of the control shown in FIG. 5.

FIG. 7 is the essential part of a flow chart for an embodiment of such control, which replaces the step S18-S20 portion of FIG. 5.

In FIG. 7, steps S21, S22 correspond to steps S18, S19, respectively. A timer is started in step S23, whether or not the value T of the timer is equal to or greater than a prescribed value M is discriminated in step S24, and when T<M, i.e., when the discrimination result is NO, the program goes to step S25. Step S25 corresponds to step S20 in FIG. 7 and when the discrimination result therein is YES, the program goes to step S17. When the discrimination result in step S25 is NO, the program returns to step S21 to repeat execution of steps S21-S25.

So long as the discrimination result in step S25 has not yet become YES, the discrimination result in step S24 becomes YES and the program goes to step S26 when T becomes equal to or greater than M (T≧M). In step S26, parameters are calculated that cause greater electrical energy to be applied than do the parameters calculated in step S21. For instance, the parameters are appropriately changed such as by increasing the values of p and q among the parameters p, q and r so as to prolong the current application period p and increase the number of current applications q.

In step S27, heavy current output processing is executed in accordance with the parameters calculated in step S26. The processing in step S27 is basically the same as that in step S22, differing therefrom only in that the magnitude of the electrical energy applied to the solenoid coil 44F during each current application period p is greater than in step S22.

In step S28, discrimination is made as to whether the absolute value of the difference ΔP obtained by subtracting the actual rail pressure Pa from the desired rail pressure Pt is smaller than the prescribed value K. When the absolute value of the difference ΔP is smaller than the prescribed value K, this means that the solenoid proportional control valve 44 is operating smoothly. In such case, the discrimination result in step S28 is YES and the program goes to step S17 to conduct normal current output processing.

On the other hand, when the absolute value of the difference ΔP is equal to or greater than the prescribed value K, this means the solenoid proportional control valve 44 is not operating smoothly and heavy current output processing is still necessary. In such case, the discrimination result in step S28 is NO and the program returns to step S26. The execution of steps S26 and S27 is thus repeated until the absolute value of the difference ΔP becomes smaller than K. Alternatively, a program can be adopted that returns to step S27 when the discrimination result in step S28 is NO.

The configuration shown in FIG. 7 achieves smooth operation of the solenoid proportional control valve 44 by using larger electrical energy when the heavy current output processing in accordance with the parameters calculated in step S21 is ineffective even when continued for a certain period of time. As such, it enables smooth operation of the solenoid proportional control valve 44 without putting a heavy burden on the solenoid proportional control valve 44.

Although the circuit configuration exemplified in FIG. 4 uses the switching transistor 8D as a low-side switch, it is possible instead to use the switching transistor 8D as a high-side switch.

Figure 8:
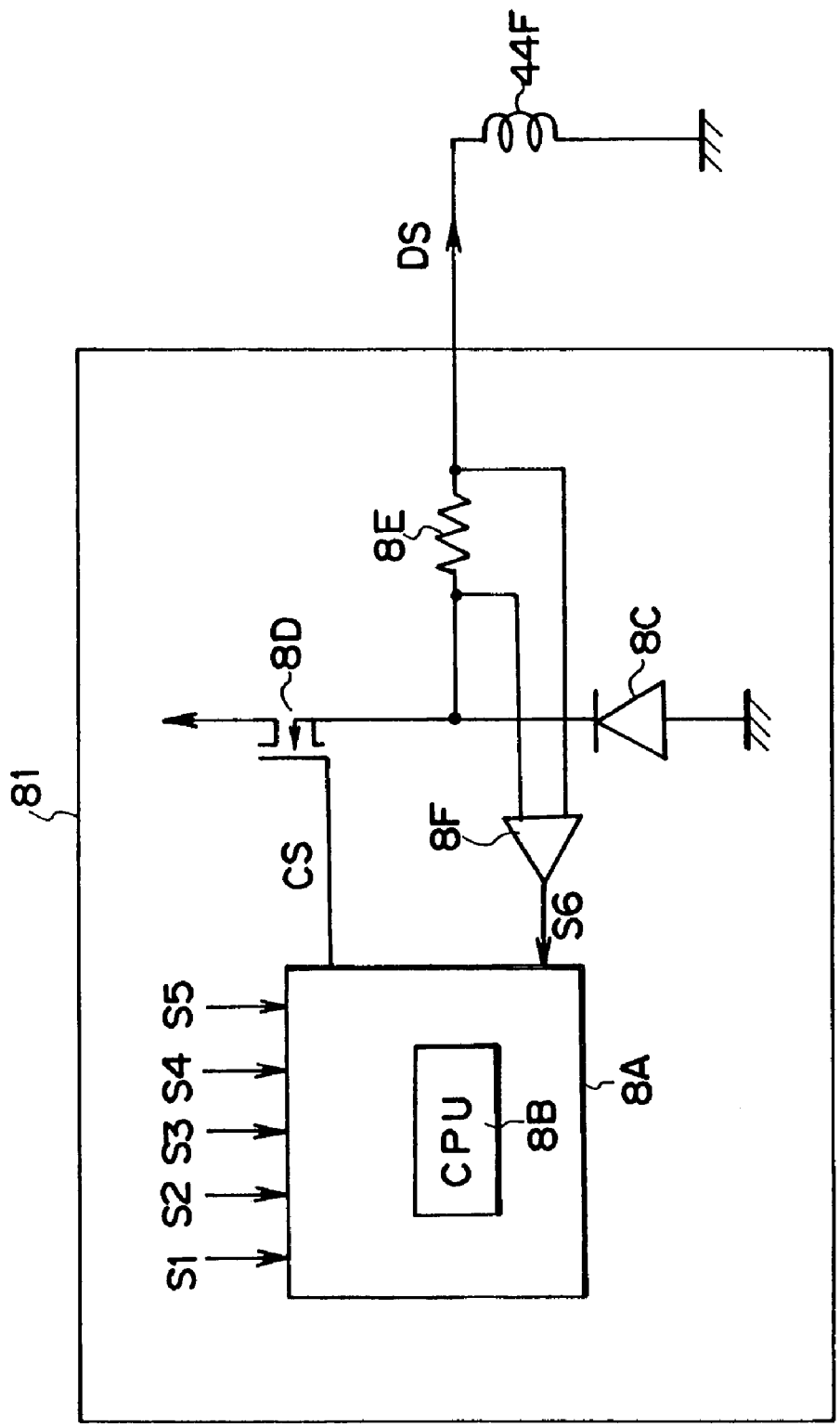
FIG. 8 is a circuit diagram showing a modification of the drive control unit shown in FIG. 4.

FIG. 8 shows a circuit diagram in the case of using the switching transistor 8D as a high-side switch. The sections of the drive control unit 81 shown in FIG. 8 that correspond to sections in FIG. 4 are assigned the same reference symbols as those in FIG. 4.

In the embodiment shown in FIG. 1, the heavy current output processing does not change the level of the voltage applied to the solenoid coil 44F but expands the time period of voltage application to the solenoid coil 44F so that the peak value Wp of the current flowing through the solenoid coil 44F during a prescribed current application period p becomes greater than the peak value Ws. However, it is also possible to adopt a configuration for the heavy current output processing in which the electrical energy applied to the solenoid coil 44A is increased by increasing the level of the voltage applied to the solenoid coil 44A without expanding the time period of voltage application.

Figure 9:
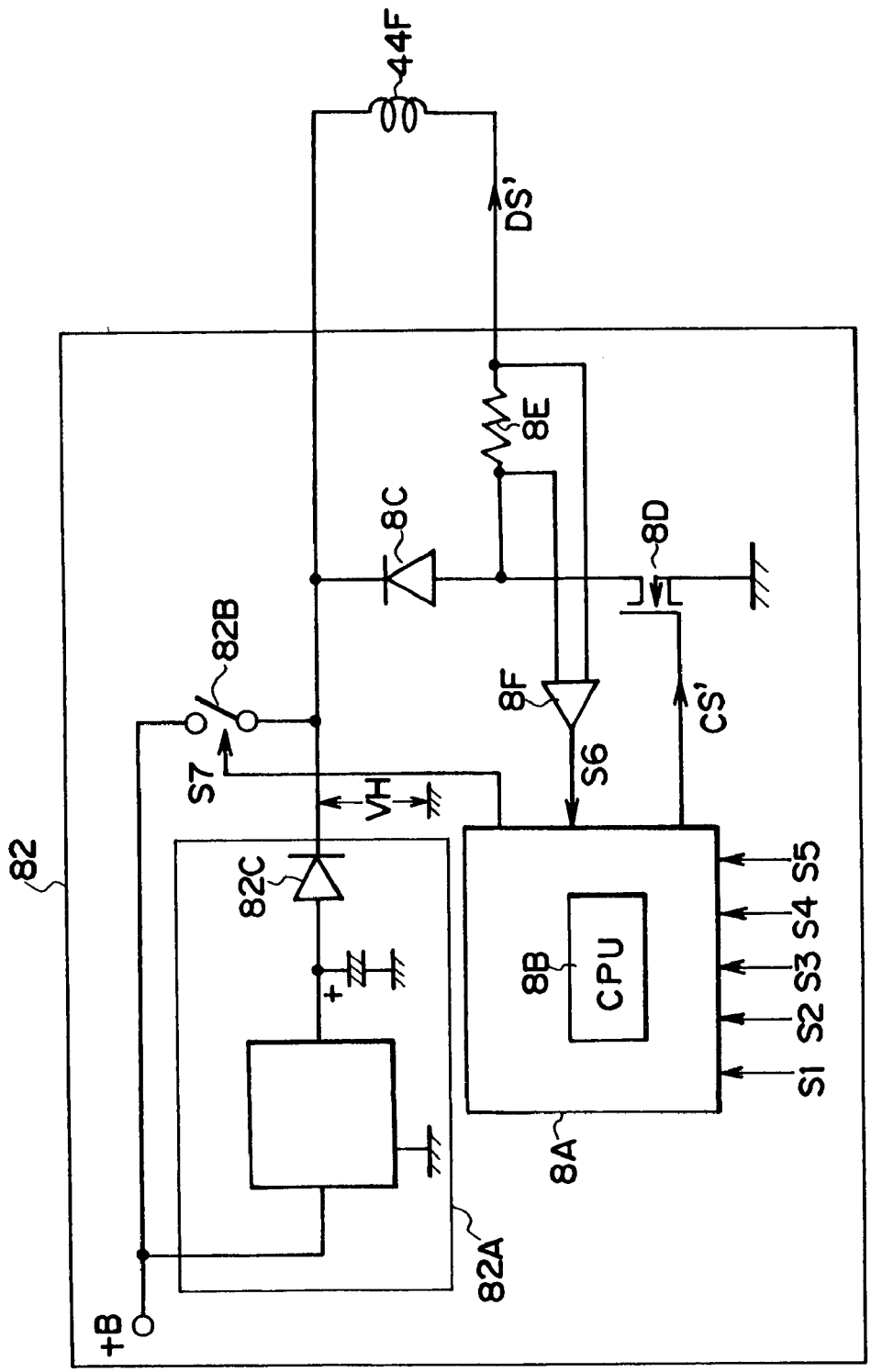
FIG. 9 is a circuit diagram showing an example of the structure of a drive control unit for switching the voltage applied to a solenoid coil to conduct heavy current output processing.

FIG. 9 is a circuit diagram of a drive control unit 82 with a circuit layout used in such a configuration. In the drive control unit 82, sections that are the same as sections of the drive control unit 8 are assigned the same reference symbols as those in the drive control unit 8. 82A is a step-up circuit for outputting a dc voltage VH higher than power supply voltage +B, and 82B is a switch for selectively applying either the power supply voltage +B or the dc voltage VH to the solenoid coil 44F. The switch 82B opens and closes in response to a switch control signal S7 from the microcomputer 8A. The dc voltage VH is applied to the solenoid coil 44F when the switch 82B is open. When the switch 82B is closed, a diode 82C is put in a reverse biased state and the power supply voltage +B is applied to the solenoid coil 44F.

Figure 10:
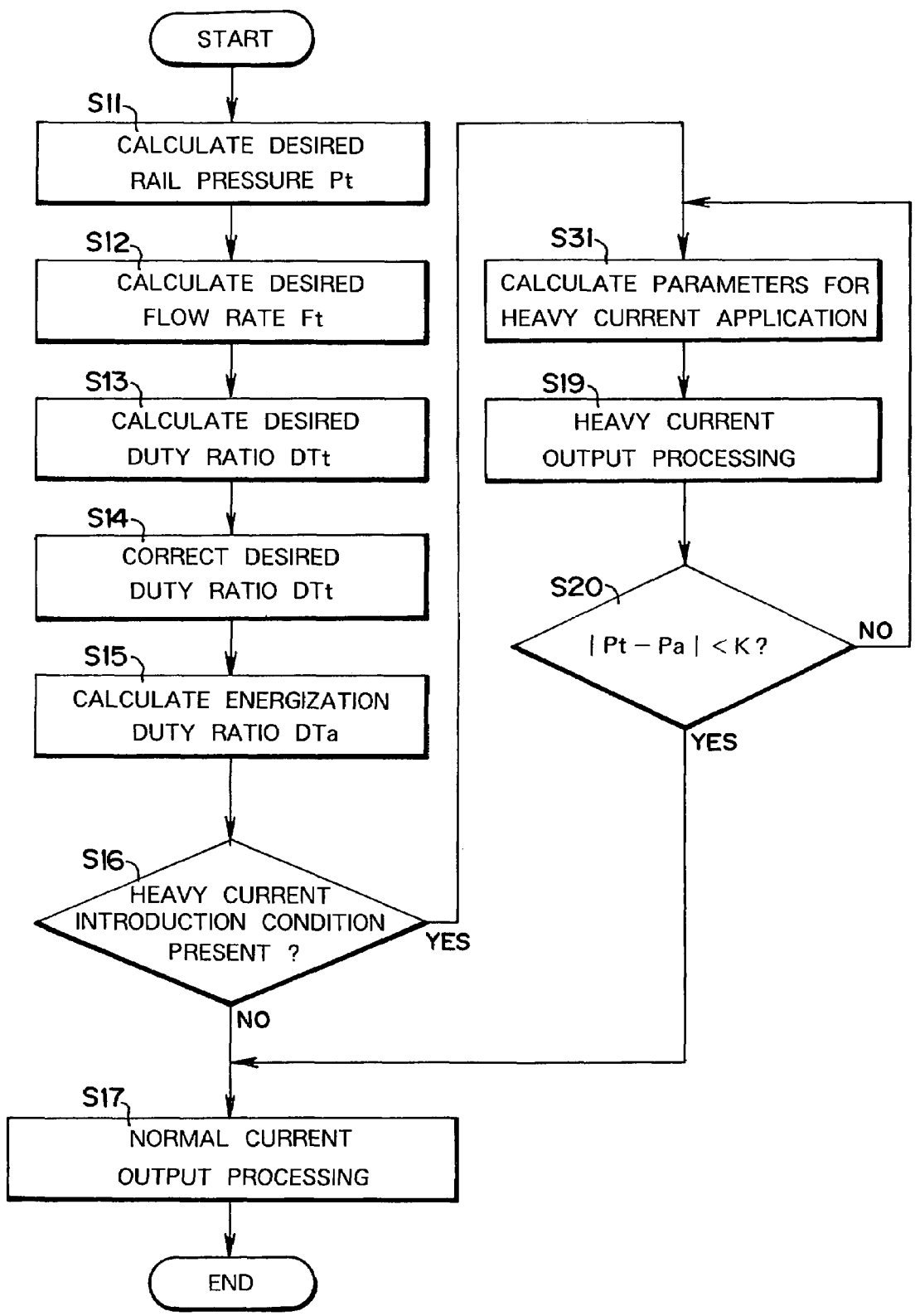
FIG. 10 is a flow chart showing a control program executed in a CPU of the drive control unit shown in FIG. 9.

FIG. 10 is a flow chart showing a control program executed in the case of using the drive control unit 82 shown in FIG. 9. Steps in the flow chart shown in FIG. 10 that are the same as steps in the flow chart shown in FIG. 5 are assigned the same reference symbols as those in FIG. 5 and explanation thereof will be omitted. The flow chart shown in FIG. 10 differs from that shown in FIG. 5 only in the step S31 for calculating parameters for heavy current application.

When the control result in step S16 is YES, the program goes to step S31, in which the current application period p and the number of applications q among the parameters are decided. Here, the control output signal CSa constituting the pulse voltage is given a constant period and the current application period p is automatically determined by deciding the number of times q that the solenoid coil 44F is driven by the high voltage VH. During the current application period p, control is effected so as to output the switch control signal S7 and open the switch 82B.

FIG. 11A shows an example of the voltage waveform of the control output signal CSa obtained by the processing in step S19. The case where q=4, i.e., where four pulses are output in each current application period p, is illustrated. During the current application period p, the switch 82B is opened by the switch control signal S7 and the high voltage VH is applied to the solenoid coil 44F.

FIG. 11B shows the current waveform of the drive signal DSa when the control output signal CSa shown in FIG. 11A is applied to the switching transistor 8D as a gate voltage signal. Owing to the application of the high voltage VH, the ON time of the switching transistor 8D during the current application periods p is the same as that during the periods s, but the peak value of the current flowing through the solenoid coil 44F is increased. Since more electrical energy is therefore applied to the solenoid coil 44F during the current application periods p than during the periods s, the solenoid proportional control valve 44 is driven with larger driving force. In other words, the pulse width of the pulse voltages is temporarily increased at appropriate time points to repeatedly carry out instantaneous boosting of the driving force of the drive solenoid.

Figure 12:
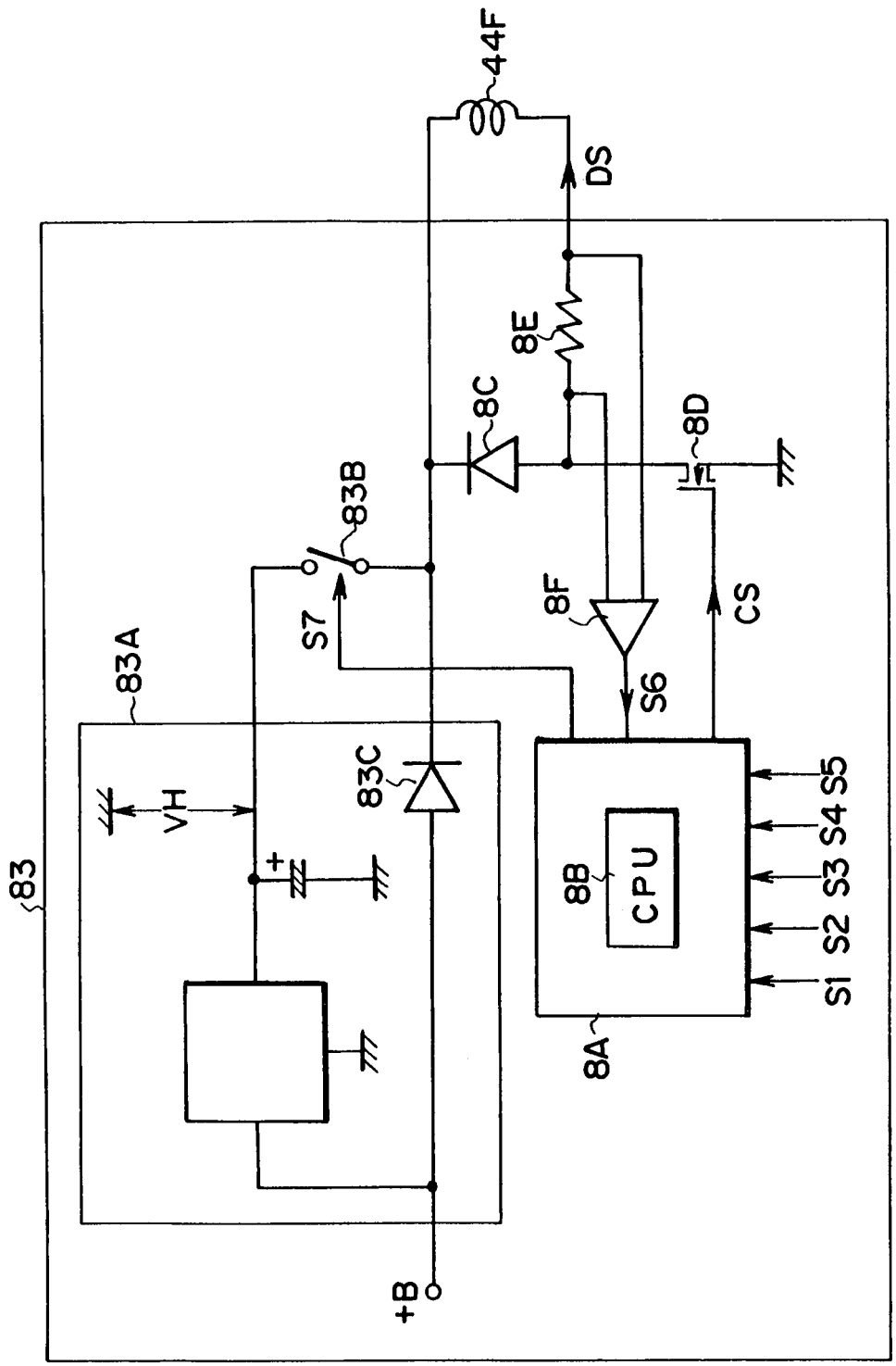
FIG. 12 is a circuit diagram showing a modification of the drive control unit shown in FIG. 9.

FIG. 12 shows a modification of the drive control unit 82 shown in FIG. 9. The sections in FIG. 12 that correspond to sections in FIG. 9 are assigned the same reference symbols as those in FIG. 9. The drive control unit 83 shown in FIG. 12 is configured to apply a high voltage VH from a high-voltage output circuit 83A to the solenoid coil 44F through a switch 83B and to apply the power supply voltage +B to the solenoid coil 44F through a diode 83C. The power supply voltage +B is therefore applied to the solenoid coil 44F when the switch 83B is open. When the switch 83B is closed, the diode 83C is put in a reverse biased state and the high voltage VH is applied to the solenoid coil 44F. In this case, therefore, the switch 83B is controlled by the switch control signal S7 to close only during the current application period p.

Figure 13:
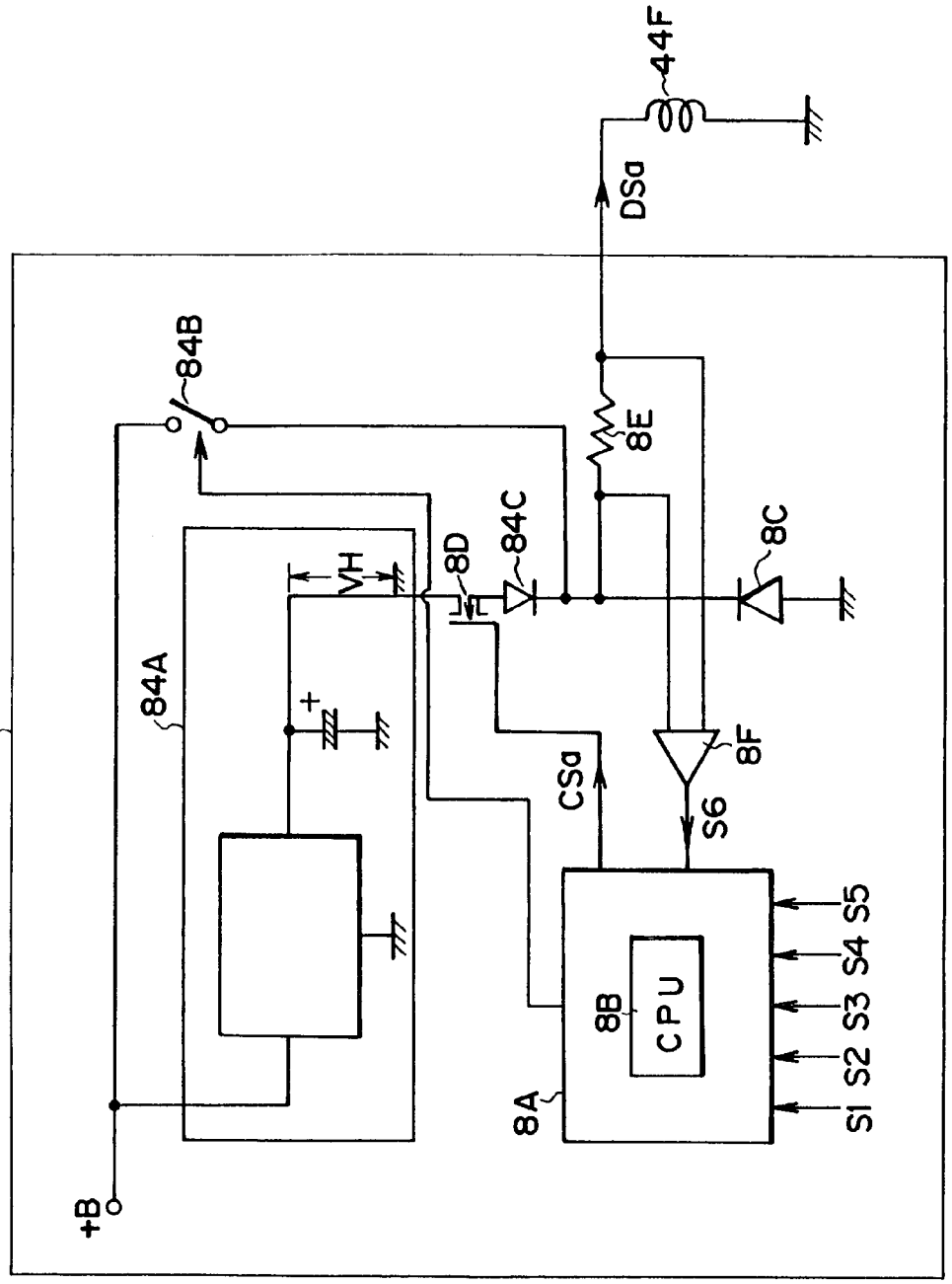
FIG. 13 is a circuit diagram showing another modification of the drive control unit shown in FIG. 9.

FIG. 13 shows another modification of the drive control unit 82 shown in FIG. 9. The sections in FIG. 13 that correspond to sections in FIG. 9 are assigned the same reference symbols as those in FIG. 9. The drive control unit 84 is provided between the switching transistor 8D and the flywheel diode 8C with a diode 84C required when the voltage applied to the solenoid coil 44F is switched by a switch 84B. When the switch 84B is open, the high voltage VH is supplied to the solenoid coil 44F through the diode 84C, and when the switch 84B is closed, the diode 84C is put in a reverse biased state and the power supply voltage +B is applied to the solenoid coil 44F. In this case, therefore, the switch 84B is controlled by the switch control signal S7 to open only during the current application period p.

Figure 14:
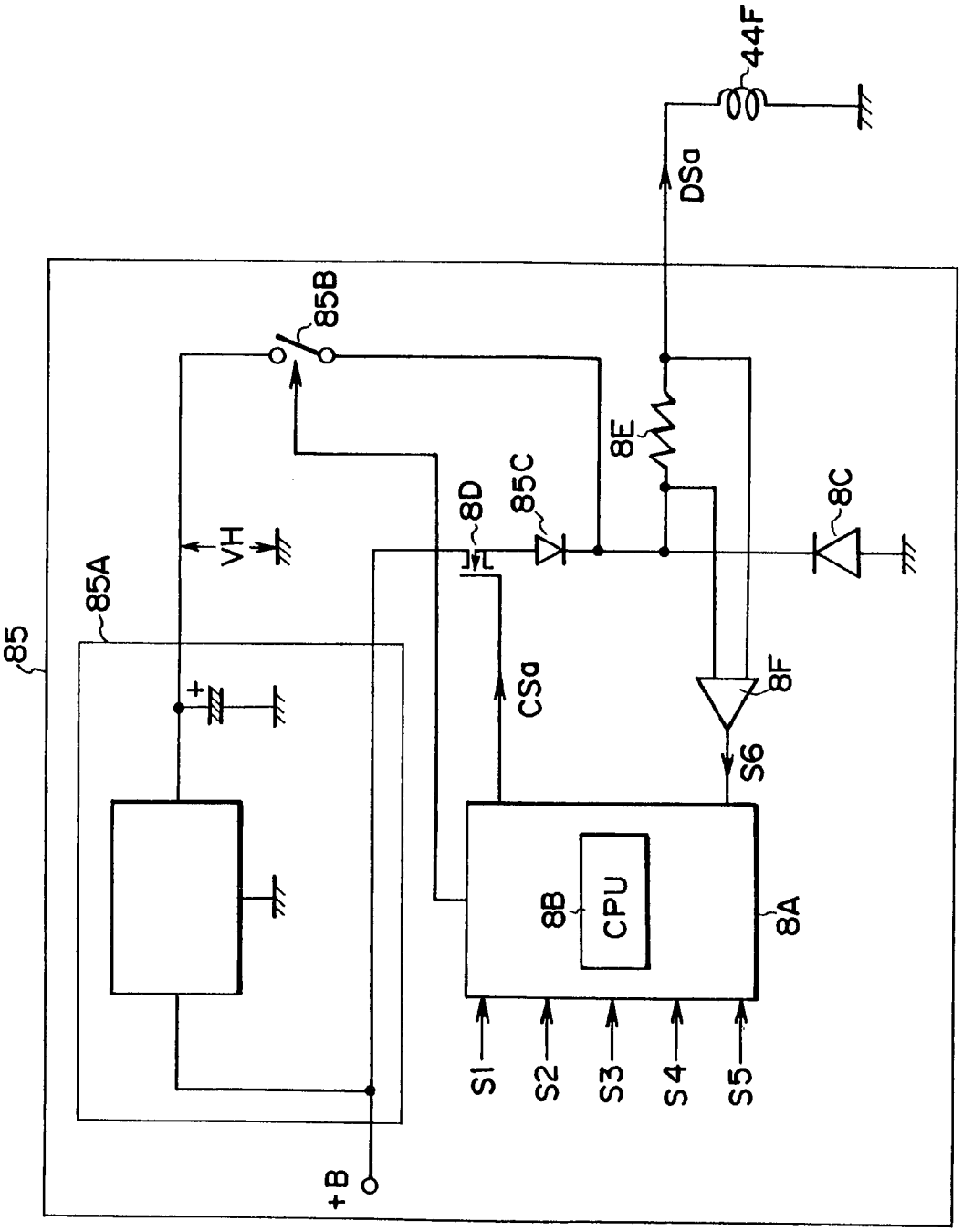
FIG. 14 is a circuit diagram showing another modification of the drive control unit shown in FIG. 9.

FIG. 14 shows another modification of the drive control unit 82 shown in FIG. 9. The sections in FIG. 14 that correspond to sections in FIG. 9 are assigned the same reference symbols as those in FIG. 9. The drive control unit 85 is provided between the switching transistor 8D and the flywheel diode 8C with a diode 85C required when the voltage applied to the solenoid coil 44F is switched by a switch 85B. When the switch 85B is open, the power supply voltage +B is applied to the solenoid coil 44F, and when the switch 84B is closed, the diode 84C is put in a reverse biased state and the high voltage VH is applied to the solenoid coil 44F. In this case, therefore, the switch 85B is controlled by the switch control signal S7 to close only during the current application period p.

The foregoing embodiments were all explained regarding the case of application to flow rate control of a common rail system pump. However, the present invention is not limited to the aforesaid embodiments but can of course be similarly applied with similar effect to solenoid proportional valves utilized for flow rate control of various fluids used for other purposes.

In accordance with the present invention, when static or dynamic friction arises between the piston and cylinder of a solenoid proportional control valve used for flow rate control of a common rail system pump, these frictional forces can be overcome to enable movement of the piston by temporarily increasing the electrical energy applied to the coil of the drive solenoid thereof at appropriate time points. Occurrence of degraded responsivity, flow rate deviation and other problems as a valve device can therefore be effectively minimized to enable stable flow rate control.

Since the present invention is configured to temporarily increase the electrical energy applied to the coil at appropriate time points, it lowers power consumption in comparison with the conventional method of continuously passing heavy current through the coil from the initial driving stage. In addition, it does not increase cost either on the solenoid side or the drive side because there is no need to raise the electrical rating to one capable of withstanding continuous application of heavy current.

INDUSTRIAL APPLICABILITY

As set out in the foregoing, the method and apparatus for driving a solenoid proportional control valve utilized for flow rate control according to the present invention enable stable flow rate control even when friction arises between the piston and cylinder of a solenoid proportional control valve used for flow rate control and, as such, help to provide an improved method and apparatus for driving a solenoid proportional control valve utilized for flow rate control.

The invention claimed is:

1. A method for driving a solenoid proportional control valve for a common rail system, said valve being arranged for flow rate control of fuel supplied from a feed pump to high-pressure plungers for feeding a high-pressure fuel to a common rail, said flow rate control being performed by regulating a driving current applied to a coil of a drive solenoid of said solenoid proportional control valve, whereby the flow rate control is performed in accordance with a desired rail pressure of the common rail, wherein said method comprises:

detecting whether or not an operating condition liable to cause hysteresis in operation of said solenoid proportional control valve exists;

intermittently conducting a temporary increase in electric energy imparted to the coil to instantaneously boost a driving force of the drive solenoid when it is determined that an operating condition liable to cause hysteresis in the operation of said solenoid proportional control valve exists, wherein said temporary increase in electric energy produces an energy level that is greater than a normal operating energy level of said solenoid proportional control valve; and temporarily discontinuing control for said temporary increase in electric energy imparted to the coil when a difference between the desired rail pressure of the common rail and an actual rail pressure of the common rail is less than a prescribed value, said difference being less than said prescribed value indicating that said solenoid proportional valve is operating smoothly, wherein detecting whether or not an operating condition liable to cause hysteresis in operation of said solenoid proportional control valve exists further comprises considering whether:

1) starting of the engine is in progress;
2) the engine is very cold;
3) a temperature of the engine is high;
4) the engine is in a specified speed range; and
5) said difference between the desired rail pressure of the common rail and an actual rail pressure is outside of said prescribed value for a prescribed time period or longer.

\* \* \* \* \*